(12) United States Patent
Bauvir

(10) Patent No.: US 12,158,126 B2
(45) Date of Patent: Dec. 3, 2024

(54) ENGINE SYSTEM

(71) Applicant: Volvo Truck Corporation, Gothenburg (SE)

(72) Inventor: Laurent Bauvir, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/379,712

(22) Filed: Oct. 13, 2023

(65) Prior Publication Data

US 2024/0133354 A1 Apr. 25, 2024
US 2024/0229748 A9 Jul. 11, 2024

(30) Foreign Application Priority Data

Oct. 19, 2022 (EP) .................................... 22306584

(51) Int. Cl.
*F02M 26/52* (2016.01)
*F02M 26/04* (2016.01)
(Continued)

(52) U.S. Cl.
CPC ............ *F02M 26/52* (2016.02); *F02M 26/04* (2016.02); *F02M 26/16* (2016.02); *F02M 26/38* (2016.02); *F02M 26/70* (2016.02)

(58) Field of Classification Search
CPC ........ F02M 26/52; F02M 26/04; F02M 26/16; F02M 26/38; F02M 26/70
See application file for complete search history.

(56) References Cited

U.S. PATENT DOCUMENTS 3,921,611 A 11/1975 Walker
6,089,019 A * 7/2000 Roby ..................... F02M 26/51
60/602

(Continued)

FOREIGN PATENT DOCUMENTS

DE 102009036284 A1 2/2011
SE 537658 C2 9/2015

(Continued)

OTHER PUBLICATIONS

European Search Report for European Patent Application No. 22306584.8, mailed Mar. 7, 2023, 2 pages.

*Primary Examiner* — Jacob M Amick
*Assistant Examiner* — Charles J Brauch
(74) *Attorney, Agent, or Firm* — Sage Patent Group

(57) ABSTRACT

An engine system includes an internal combustion engine with two sets of cylinders, a turbocharger, two exhaust conduits providing fluid communication between the turbocharger and an exhaust of the cylinders, and an exhaust gas recirculation system including a recirculation valve. Two proportional exhaust valves are adapted to control a flow of exhaust gas in the two exhaust conduits. An actuator includes an output component operating the recirculation valve and the two exhaust valves. In a neutral position, the two exhaust valves are open and the recirculation valve is closed. A first movement of the output component, from its neutral position towards a first position, open the recirculation valve and close a first of the two exhaust valve. A second movement, from the first position and in the same direction as the first movement, close the second exhaust valve and hold open the recirculation valve and closed the first exhaust valve.

18 Claims, 6 Drawing Sheets

(51) Int. Cl.
    *F02M 26/16*     (2016.01)
    *F02M 26/38*     (2016.01)
    *F02M 26/70*     (2016.01)

(56) References Cited

U.S. PATENT DOCUMENTS

| | | |
|---|---|---|
| 10,273,910 B1 | 4/2019 | Elias et al. |
| 2010/0024414 A1 | 2/2010 | Hittle et al. |
| 2010/0024417 A1* | 2/2010 | Pierpont ................ F02M 26/08 60/624 |
| 2013/0199176 A1 | 8/2013 | Cattani et al. |

FOREIGN PATENT DOCUMENTS

| | | |
|---|---|---|
| WO | 2007089771 A2 | 8/2007 |
| WO | 2015155528 A1 | 10/2015 |
| WO | 2018113930 A1 | 6/2018 |
| WO | 2020064102 A1 | 4/2020 |

\* cited by examiner

ENGINE SYSTEM

CROSS REFERENCE TO RELATED APPLICATION

This application claims foreign priority to European Application No. 22306584.8 filed on Oct. 19, 2022, the disclosure and content of which is incorporated by reference herein in its entirety.

TECHNICAL FIELD

The disclosure relates generally to vehicles powered by internal combustion engine. In particular aspects, the disclosure relates to an engine system.

The disclosure can be applied in heavy-duty vehicles, such as trucks, buses, and construction equipment. Although the disclosure will be described with respect to a particular vehicle, the disclosure is not restricted to any particular vehicle.

BACKGROUND

In the domain of heavy-duty vehicles, such as trucks, powered by an internal combustion engine, it is known to provide an engine system comprising an internal combustion engine with two set of cylinders, each set of cylinders having a separate exhaust collector in fluid communication with a turbocharger. Such an engine system usually comprises two proportional exhaust valves, each proportional exhaust valve being operable to control the flow of exhaust gas from the exhaust collector of one of the set of cylinders to the turbocharger.

When the vehicle is operated in normal condition, the flow of exhaust gas generated by each set of cylinders is directed from the exhaust collector of the corresponding set of cylinders to the turbocharger.

It is also known to use an exhaust gas recirculation technique to decrease the nitrogen oxide emission of the engine. This technique consists in redirecting the flow of exhaust gas from a first exhaust collector to an intake of the internal combustion engine, while allowing the flow of exhaust gas from the second exhaust collector to the turbocharger. The engine system thus comprises a recirculation conduit providing fluid communication between the first exhaust collector and the intake of the internal combustion engine and a proportional recirculation valve to control the flow of exhaust gas through the recirculation conduit, which is open when the exhaust gas recirculation technique is used and closed otherwise.

It is also known to close the two proportional exhaust valves so as to prevent the flow of exhaust gas from the two exhaust collectors to the turbocharger under certain operating conditions, for example to brake the engine.

Therefore, such usual engine system comprises three actuators, each actuator operating one valve among the two proportional exhaust valves and the proportional recirculation valve. Due to the presence of several actuators, these engine systems are expensive to manufacture, cumbersome and prone to failure.

It is to these disadvantages that the disclosure intends more particularly to remedy by proposing an engine system that is less expensive to manufacture, more compact and more reliable.

SUMMARY

The disclosure aims to improve the compactness of the engine system by reducing the number of actuators needed to operate the engine system valves.

According to an aspect of the disclosure, the disclosure concerns an engine system comprising:
- an internal combustion engine, comprising an intake, a first set of cylinders including at least a first cylinder and a first exhaust collector, and a second set of cylinders including at least a second cylinder and a second exhaust collector,
- a turbocharger,
- a first exhaust conduit, providing fluid communication between the first exhaust collector and the turbocharger,
- a second exhaust conduit, providing fluid communication between the second exhaust collector and the turbocharger,
- an exhaust gas recirculation system, comprising:
    - a recirculation conduit, providing fluid communication between the first exhaust collector and the intake of the internal combustion engine, and
    - a proportional recirculation valve, adapted to control a flow of exhaust gas in the recirculation conduit, and operable between an open position in which the flow of exhaust gas is allowed, and a closed position in which the flow of exhaust gas is prevented and which is occupied by the proportional recirculation valve at rest, the proportional recirculation valve continuously opening and closing between its open position and its closed position,
- a first proportional exhaust valve, adapted to control a flow of exhaust gas in the first exhaust conduit, and operable between an open position in which the flow of exhaust gas is allowed and which is occupied by the first proportional exhaust valve at rest, and a closed position in which the flow of exhaust gas is prevented, the first proportional exhaust valve continuously opening and closing between its open position and its closed position, and
- a second proportional exhaust valve, adapted to control a flow of exhaust gas in the second exhaust conduit, and operable between an open position in which the flow of exhaust gas is allowed and which is occupied by the second proportional exhaust valve at rest, and a closed position in which the flow of exhaust gas is prevented, the second proportional exhaust valve continuously opening and closing between its open position and its closed position.

The engine system comprises an actuator, and a kinematic chain configured to operate the proportional recirculation valve, the first proportional exhaust valve and the second proportional exhaust valve, the actuator comprising an output component driving the kinematic chain.

The engine system is in a neutral configuration when the first proportional exhaust valve and the second proportional exhaust valve are open and the proportional recirculation valve is closed, the output component of the actuator being in a neutral position when the engine system is in the neutral configuration.

The output component and the kinematic chain are configured such that a first movement of the output component, from its neutral position towards a first position and in a first direction, is adapted to drive the kinematic chain so as to open the proportional recirculation valve, close the first proportional exhaust valve and not operate the second proportional exhaust valve, the second proportional exhaust valve staying in its open position during the first movement.

The output component and the kinematic chain are configured such that a second movement of the output component, from its first position towards a second position and in the first direction, is adapted to drive the kinematic chain so as to close the second proportional exhaust valve, hold open the proportional recirculation valve and hold closed the first proportional exhaust valve.

Hereby, a technical effect of the disclosure includes needing only one actuator to operate the three valves of the engine system, and allowing to operate only the proportional recirculation valve and the first proportional exhaust valve, or only the second proportional exhaust valve, depending on the movement of the output component of the actuator. Owing to the disclosure, the engine system is less expensive to manufacture, more compact and more reliable than existing engine systems.

In certain examples, the kinematic chain comprises:
- a main shaft connected to the output component of the actuator,
- a first cam system, comprising a first cam mounted onto the main shaft and a first follower attached to the first proportional exhaust valve, wherein the profile of the first cam is configured such that:
  - during the first movement of the output component, the first cam engages the first follower so that the first follower closes the first proportional exhaust valve, and
  - during the second movement of the output component, the first cam engages the first follower so that the first follower hold closed the first proportional exhaust valve,
- a second cam system, comprising a second cam mounted onto the main shaft and a second follower attached to the second proportional exhaust valve, wherein the profile of the second cam is configured such that:
  - during the first movement of the output component, the second cam engages the second follower so that the second follower does not operate the second proportional exhaust valve, and
  - during the second movement of the output component, the second cam engages the second follower so that the second follower closes the second proportional exhaust valve,
- a third cam system, comprising a third cam mounted onto the main shaft and a third follower attached to the proportional recirculation valve, wherein the profile of the third cam is configured such that:
  - during the first movement of the output component, the third cam engages the third follower so that the third follower opens the proportional recirculation valve, and
  - during the second movement of the output component, the third cam engages the third follower so that the third follower holds open the proportional recirculation valve.

Hereby, the opening and closing of the first and second proportional exhaust valves and the proportional recirculation valve are precisely controlled by the three cam systems, such cam systems having the added advantage of being reliable, effective and inexpensive.

In certain examples, the first follower, the second follower and the third follower are roller followers. Hereby, the manufacturing cost of the kinematic chain is low, since such roller followers are inexpensive to manufacture. Furthermore, the efficiency of the engine system is increased, since the use of roller followers lead to low friction with the cams.

In certain examples, the first cam system, the second cam system and the third cam system are desmodromic cam systems, allowing to force the opening and the closing of the first proportional exhaust valve, of the second proportional exhaust valve and of the proportional recirculation valve. Hereby, the position of the first and second proportional exhaust valve and of the proportional recirculation valve are precisely controlled both when opening and closing, eliminating any risk of jamming.

In certain examples, the first proportional exhaust valve and the second proportional exhaust valve are asymmetric flap valves comprising each a flap and a valve shaft, the valve shafts are configured such that the rotations of the valve shafts lead to the opening or closing of the flaps and the output component, the kinematic chain and the valve shafts are configured such that the rotation of the valve shafts is driven by the output component. Thanks to the use of asymmetric flap valves, the proportional exhaust valves return naturally to the open position when the actuator is not operating the proportional exhaust valves, thus improving the operation of the engine system.

In certain examples, the valve shaft of the first proportional exhaust valve is off-center with respect to the flap of the first proportional exhaust valve and located outside of the flow of exhaust gas in the first exhaust conduit, and the valve shaft of the second proportional exhaust valve is off-center with respect to the flap of the second proportional exhaust valve and located outside of the flow of exhaust gas in the second exhaust conduit. Hence, when the first and second proportional exhaust valve are opened, the flows of exhaust gas in the first and second exhaust conduits are not disturbed, thus increasing the efficiency of the engine system.

In certain examples, the proportional recirculation valve is a poppet valve. Thanks to the use of a poppet valve, controlling the proportional recirculation valve when gas recirculation is needed is particularly simple, effective and reliable In certain examples, the output component and the kinematic chain are configured such that a third movement of the output component, from its neutral position towards a third position and in a second direction opposite to the first direction, is adapted to drive the kinematic chain so as to close the first proportional exhaust valve and the second proportional exhaust valve and not operate the proportional recirculation valve, the proportional recirculation valve staying in its closed position during the third movement. Hence, with no added parts or systems, the output component can operate the first and second proportional exhaust valve and the proportional recirculation valve in a third manner, thus increasing the number of configurations the engine system can take and therefore its versatility.

In certain examples, the output component and the kinematic chain are configured such that the third movement of the output component closes the first proportional exhaust valve and the second proportional exhaust valve simultaneously and at the same speed. Hereby, the flow of exhaust gas in the first exhaust conduit is identical to the flow of exhaust gas in the second exhaust conduit, which improves the performances of the engine system.

In certain examples, the engine system further comprises a second exhaust gas recirculation system, comprising:
- a second recirculation conduit, providing fluid communication between the second exhaust collector and the intake of the internal combustion engine, and
- a second proportional recirculation valve, adapted to control a flow of exhaust gas in the second recirculation conduit, and operable between an open position in which the flow of exhaust gas in the second recirculation conduit is allowed, and a closed position in which the flow of exhaust gas in the second recirculation conduit is prevented and which is occupied by the second proportional recirculation valve at rest, the second proportional recirculation valve continuously opening and closing between its open position and its closed position.

The kinematic chain is configured to operate the second proportional recirculation valve, the first movement of the output component 51 drive the kinematic chain so as to open the second proportional recirculation valve, and the second movement of the output component drive the kinematic chain so as to hold open the second proportional recirculation valve. Hence, since the actuator also operates the second proportional recirculation valve, the engine system is even less expensive to manufacture and more compact than existing engine systems.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
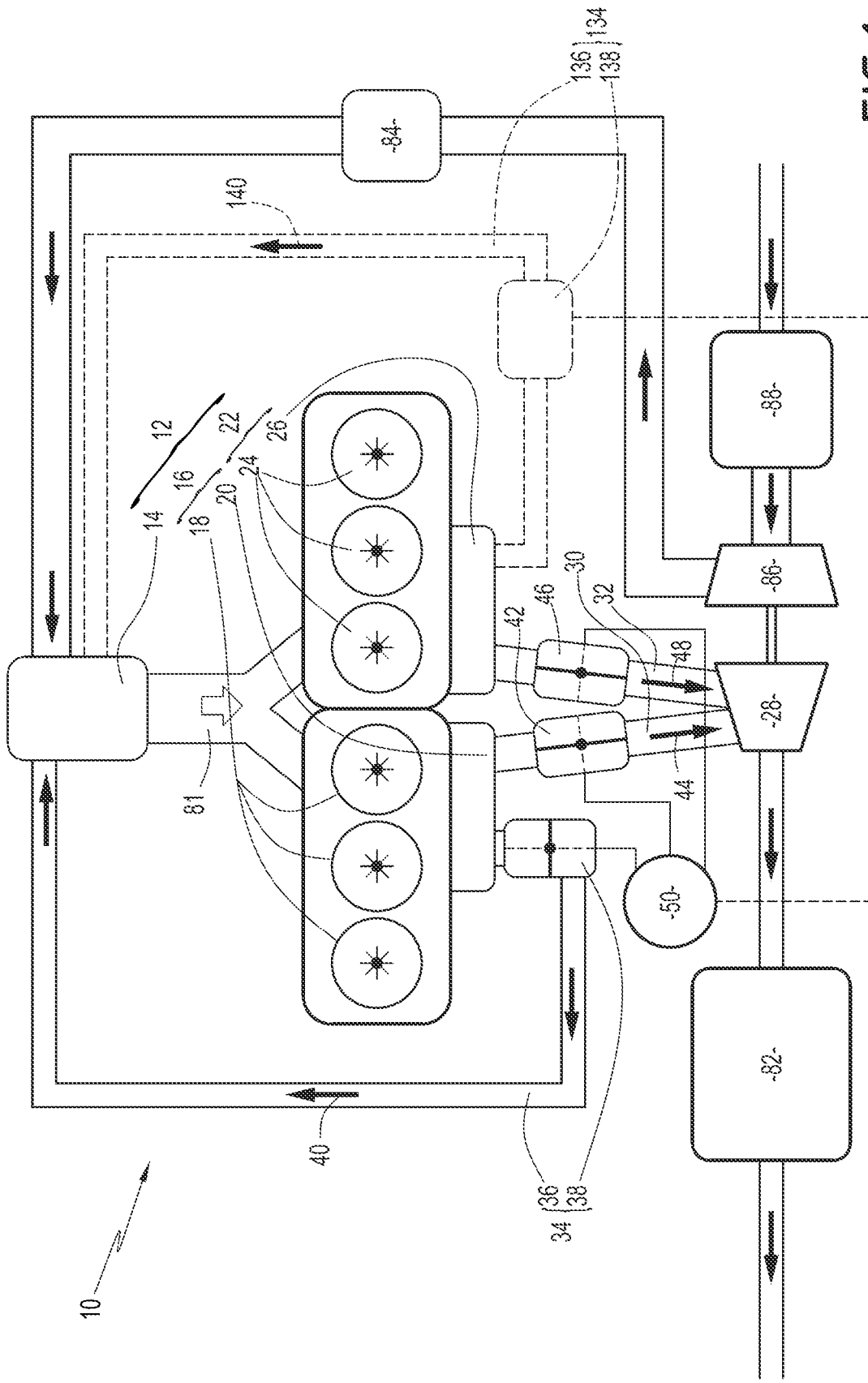
FIG. 1 is a schematic view of an exemplary engine system according to the disclosure.

An exemplary engine system 10 is visible in FIG. 1. The engine system 10 is intended to be installed in a vehicle to propel the vehicle. Such a vehicle can be, for example, a heavy-duty vehicle, such as a truck, a bus or a construction equipment.

The engine system 10 comprises an internal combustion engine 12, propelled by the combustion of a fuel, such as, for example, diesel. The internal combustion engine 12 comprises an intake 14, a first set of cylinders 16 including at least a first cylinder 18 and a first exhaust collector 20, and a second set of cylinders 22 including at least a second cylinder 24 and a second exhaust collector 26. In the example, the first and second sets of cylinders each comprise three cylinders 18, 24. As a variant, not shown, each set of cylinders comprises a different number of cylinders, for example four cylinders.

The engine system 10 comprise an intake conduit 81, providing fluid communication between the intake 14 and the first and second sets of cylinders 16, 22. The intake 14 provides an oxidizing agent, such as air, to the first and second sets of cylinders, for the fuel combustion.

The engine system 10 comprises a fuel injection system, not shown, providing fuel to the first and second sets of cylinders 16, 22.

The engine system 10 comprises a turbocharger 28, a first exhaust conduit 30, providing fluid communication between the first exhaust collector 20 and the turbocharger, and a second exhaust conduit 32, providing fluid communication between the second exhaust collector 26 and the turbocharger.

Advantageously, the engine system 10 comprises an exhaust after-treatment system 82, in fluid communication on its intake with the output of the turbocharger 28 and on its output with an exhaust system, not shown. The exhaust after-treatment system 82 is configured to clean the exhaust gases produced by the internal combustion engine 12, by filtering certain pollutants and transforming other pollutants into non-polluting gases by means of chemical reactions.

Advantageously, the engine system 10 comprises a charged air cooler 84. The output of the charged air cooler 84 is in fluid communication with the intake 14 of the internal combustion engine 12. The charged air cooler 84 provides cooled air to the internal combustion engine 12.

Advantageously, the engine system 10 comprises a compressor 86, providing compressed air to the charged air cooler 84. In the example, the compressor 86 is driven by the turbocharger 28.

Advantageously, the engine system 10 comprises an air filter 88, in fluid communication with the intake of the compressor 86, thus filtering the air provided to the compressor 86 and to the charged air cooler 84.

The engine system 10 comprises an exhaust gas recirculation system 34, allowing recirculating the exhaust gases of the first set of cylinders 16 to the intake 14 of the internal combustion engine 12. The exhaust gas recirculation system 34 comprises a recirculation conduit 36 and a proportional recirculation valve 38.

The recirculation conduit 36 provides fluid communication between the first exhaust collector 20 of the first set of cylinders 16 and the intake 14 of the internal combustion engine 12.

The proportional recirculation valve 38 is adapted to control a flow of exhaust gas 40 in the recirculation conduit 36. The proportional recirculation valve 38 is operable between an open position, in which the flow of exhaust gas 40 is allowed, and a closed position, in which the flow of exhaust gas 40 is prevented, the closed position being a resting position of the proportional recirculation valve 38. In other words, the closed position is occupied by the proportional recirculation valve at rest. The proportional recirculation valve 38 is a continuously operable valve, that is, a valve continuously opening and closing between its open position and its closed position.

Thus, the intake 14 of the internal combustion engine 12 is provided with air by the charged air cooler 84, and when the proportional recirculation valve 38 is in its open position, it is provided with exhaust gases by the exhaust gas recirculation system 34.

In the example, the proportional recirculation valve 38 is a poppet valve, that is, a linearly activated valve. The engine system 10 may comprise a non-represented return spring, which exerts a force on the proportional recirculation valve 38 that tends to close the proportional recirculation valve. As a variant, the proportional recirculation valve 38 is another type of valve, such as, for example, a flap valve.

The engine system 10 comprises a first proportional exhaust valve 42, adapted to control a flow of exhaust gas 44 in the first exhaust conduit 30, and operable between an open position, in which the flow of exhaust gas is allowed, and a closed position, in which the flow of exhaust gas is prevented, the open position being a resting position of the first proportional exhaust valve. In other words, the closed position is occupied by the first proportional exhaust valve at rest. The first proportional exhaust valve 42 is a continuously operable valve, that is, a valve continuously opening and closing between its open position and its closed position.

The engine system 10 comprises a second proportional exhaust valve 46, adapted to control a flow of exhaust gas 48 in the second exhaust conduit 32, and operable between an open position, in which the flow of exhaust gas is allowed, and a closed position, in which the flow of exhaust gas is prevented, the open position being a resting position of the second proportional exhaust valve. In other words, the closed position is occupied by the second proportional exhaust valve at rest. The second proportional exhaust valve 46 is a continuously operable valve, that is, a valve continuously opening and closing between its open position and its closed position.

In the example, the first proportional exhaust valve 42 is an asymmetric flap valve comprising a flap 52 and a shaft 56 on which the flap is fixed. The rotation of the shaft 56 leads to the opening or closing of the flap 52. Advantageously, the shaft 56 is off-center with respect to the flap 52. Similarly, the second proportional exhaust valve 46 is an asymmetric flap valve comprising a flap 54 and a shaft 58 on which the flap is fixed. The rotation of the shaft 58 leads to the opening or closing of the flap 54. Advantageously, the shaft 58 is off-center with respect to the flap 54.

As a variant, the first and second proportional exhaust valves 42, 46 are of another type of valves, such as, for example, poppet valves.

Practically speaking, the open position of the first and second proportional exhaust valves 42, 46 are the resting position of the proportional exhaust valves due to the shafts 56, 58 not being centered in relation with the flaps 52, 54 and to the action of the exhaust gases from the exhaust collectors 20, 26, which exerts pressure on the flaps 52, 54 leading to the opening of the flaps. In other words, the shafts 56, 58 are respectively off-center with respect to the flaps 52, 54. Thus, the flaps 52, 54 are located respectively outside of the flow of exhaust gas 44 in the first exhaust conduit 30 and outside of the flow of exhaust gas 48 in the second exhaust conduit 32. Therefore, when the first and second proportional exhaust valves 42, 46 are in their open position, the flaps 52, 54 do not disturb the flows of exhaust gas 44, 48, and the efficiency of the engine system 10 is increased.

Optionally, the first and second proportional exhaust valves 42, 46 comprise return springs to force the opening of the flaps 52, 54. With such springs, the proportional exhaust valves 42, 46 can be symmetric flap valves, with the shafts 56, 58 centered with respect to the flaps 52, 54.

By operating the proportional recirculation valve 38, the first proportional exhaust valve 42 and the second proportional exhaust valve 46, the engine system is switchable between multiple configurations. Four exemplary configuration are described here below.

Figure 2:
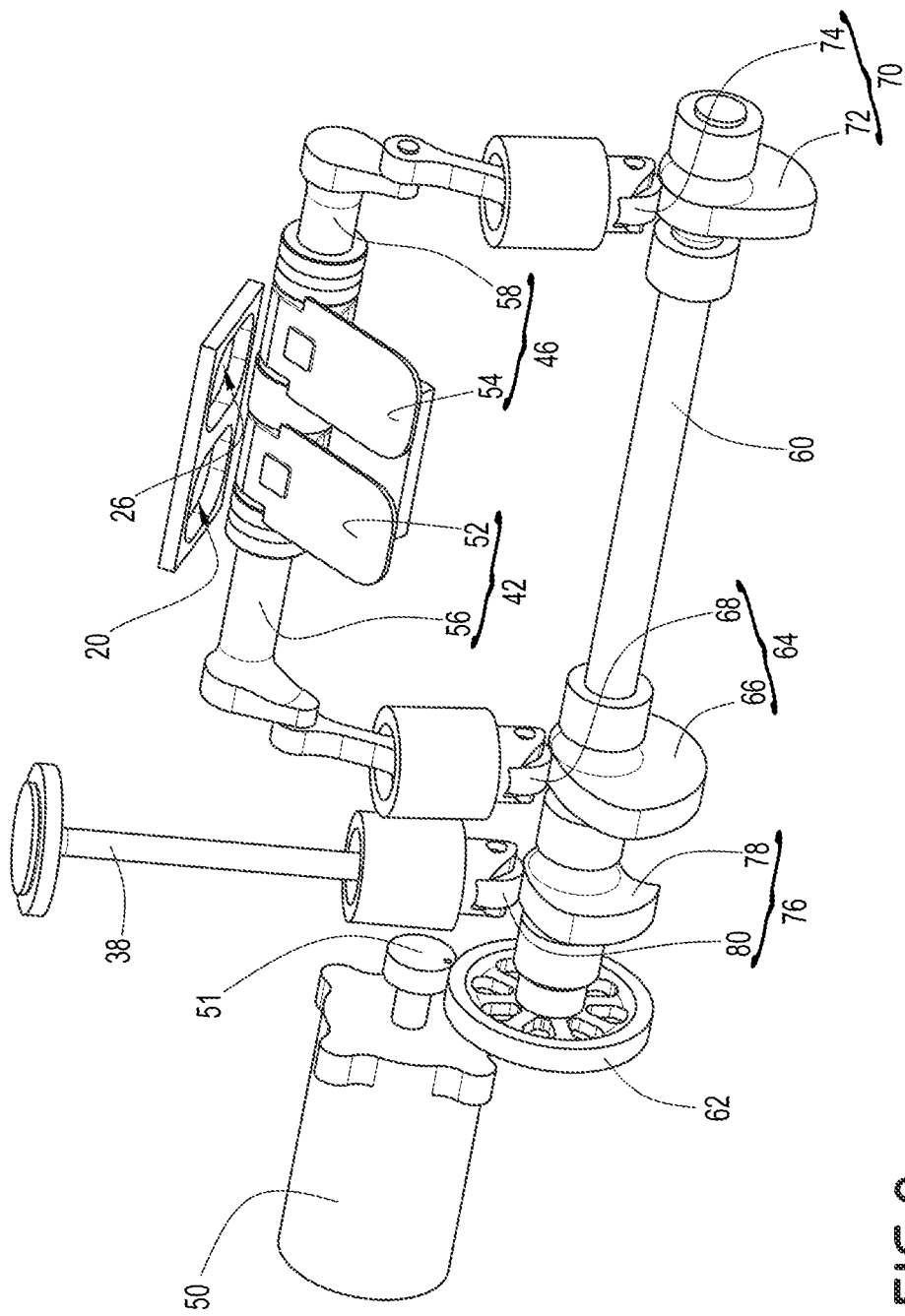
FIG. 2 is a perspective view of a portion of the engine system of FIG. 1, in a first configuration.

In a neutral configuration of the engine system 10, the first and second proportional exhaust valves 42, 46 are in their open position and the proportional recirculation valve 38 is in its closed position. In other words, in the neutral position, the flow of exhaust gas 40 is prevented and the flows of exhaust gases 44 and 48 are allowed, so that the exhaust gases generated by the internal combustion engine 12 are completely redirected to the turbocharger 28. The neutral configuration is represented on FIG. 2. The neutral configuration is also designed as a normal operating condition, or normal operating configuration.

Figure 3:
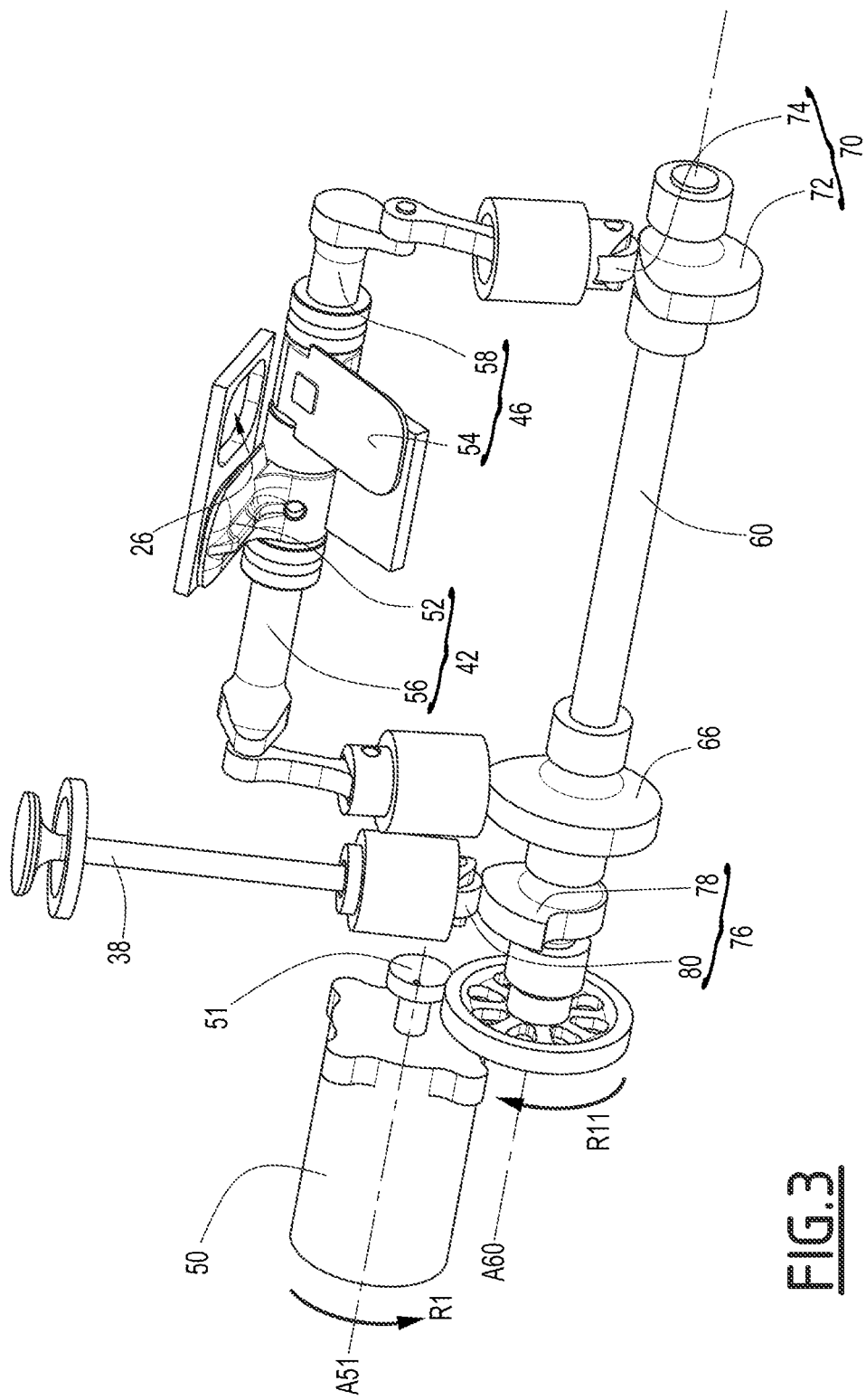
FIG. 3 is a perspective view of a portion of the engine system of FIG. 1, similar to FIG. 2, in a second configuration.

In a recirculation configuration of the engine system 10, the first proportional exhaust valve 42 is in its closed position, the second proportional exhaust valve 46 is in its open position and the proportional recirculation valve 38 is in its open position. In other words, in the recirculation configuration, the flow of exhaust gas 40 is allowed, the flow of exhaust gas 44 is prevented and the flow of exhaust gas 48 is allowed. Thus, in this configuration, the first exhaust collector 20 is in fluid communication with the intake 14 and the second exhaust collector 26 is in fluid communication with the turbocharger 28. Hence, the recirculation configuration can be used when recirculation of exhaust gas is needed, for example to decrease the nitrogen oxide emission of the internal combustion engine 12. The recirculation configuration is represented on FIG. 3.

Figure 4:
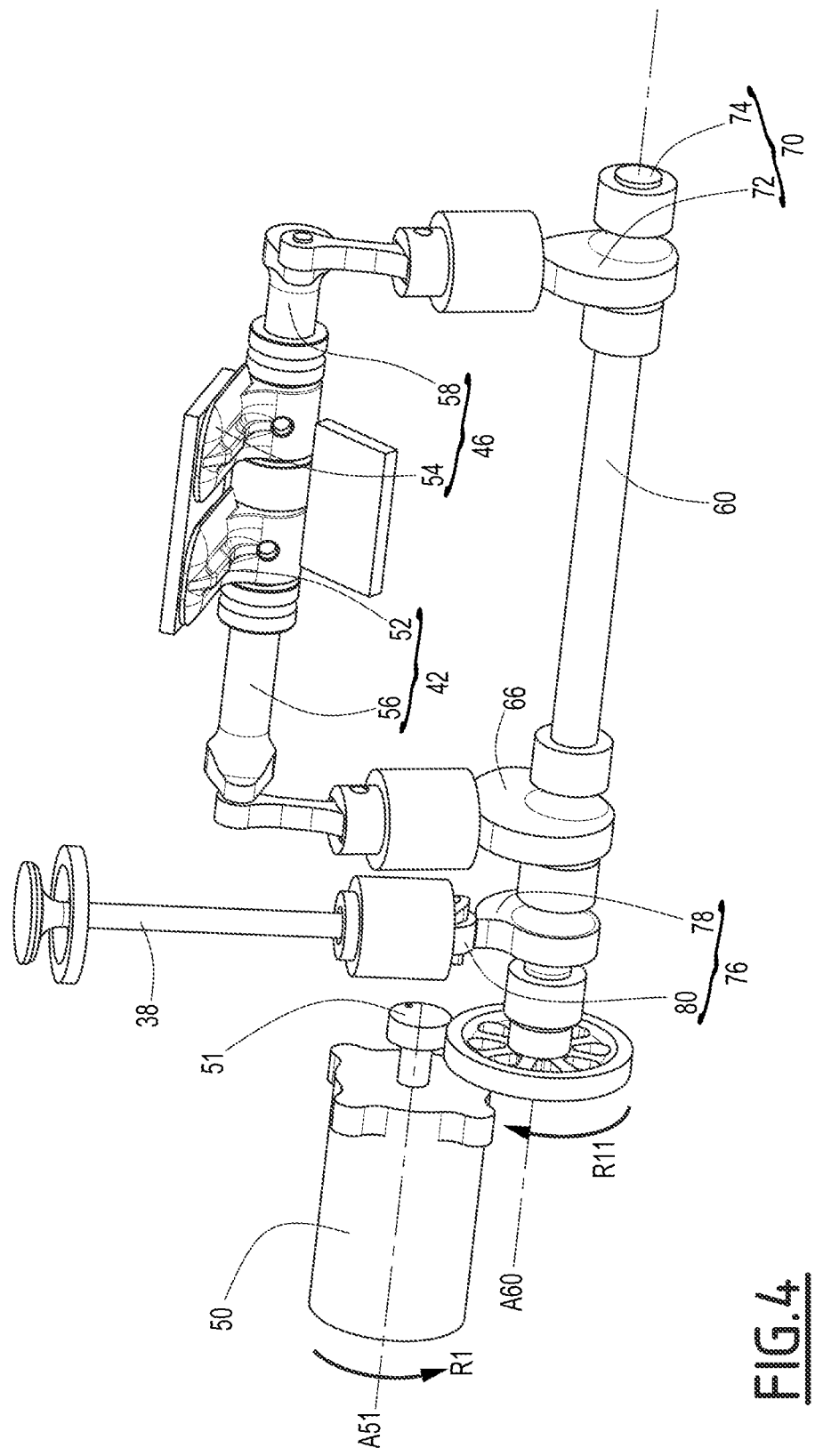
FIG. 4 is a perspective view of a portion of the engine system of FIG. 1, similar to FIGS. 2 and 3, in a third configuration.

In a cylinder deactivation configuration of the engine system 10, the first proportional exhaust valve 42 is in its closed position, the second proportional exhaust valve 46 is in its closed position and the proportional recirculation valve 38 is in its open position. In other words, in the cylinder deactivation configuration, the flow of exhaust gas 40 is allowed, the flow of exhaust gas 44 is prevented and the flow of exhaust gas 48 is prevented. Thus, in this configuration, the first exhaust collector 20 is in fluid communication with the intake 14 and the second exhaust collector 26 is blocked, that is, is not in fluid communication with any other part of the engine system 10. Therefore, the exhaust gases generated by the second cylinders 24 are prevented to exist the second exhaust collector 26, thus increasing the pressure in the second exhaust collector 26. This configuration allows to deactivate the cylinders 24 of the second set of cylinders 22, leading to an increase in temperature of the engine system 10, while allowing for recirculation of exhaust gases from the first set of cylinders 16. The cylinder deactivation configuration is, for example, particularly useful for regeneration purposes of the exhaust after treatment system 82, or other use cases that request the highest thermal power be transferred to the exhaust after treatment system 82. The cylinder deactivation configuration is represented on FIG. 4.

Figure 5:
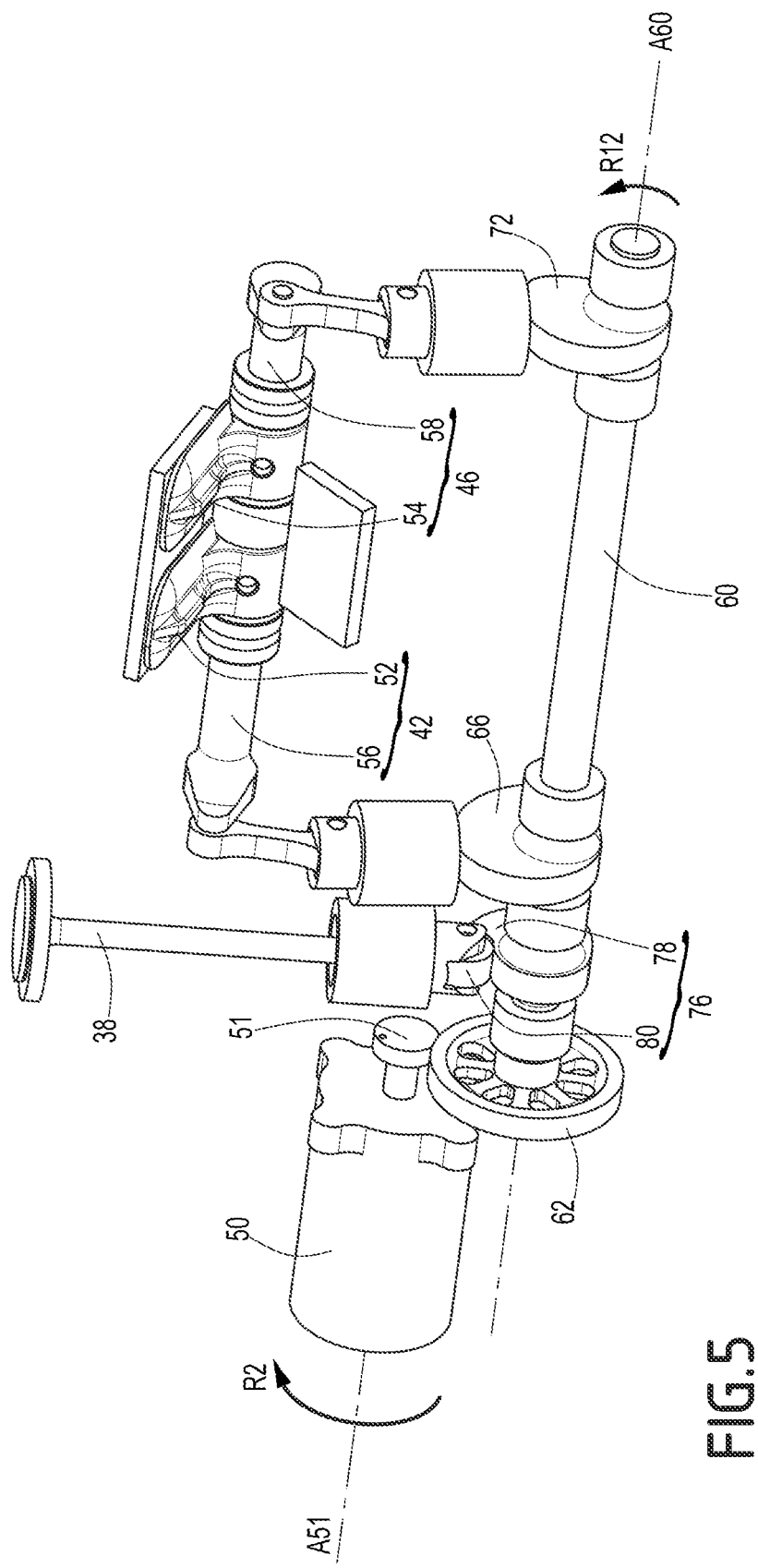
FIG. 5 is a perspective view of a portion of the engine system of FIG. 1, similar to FIGS. 2, 3 and 4, in a fourth configuration.

In a braking configuration of the engine system 10, the first and second proportional exhaust valves 42, 46 are in their closed position and the proportional recirculation valve 38 is in its closed position. In other words, in the braking configuration, the flow of exhaust gas 40 is prevented and the flows of exhaust gases 44 and 48 are also prevented, so that the exhaust gases generated by the internal combustion engine 12 are prevented to exit the internal combustion engine, thus increasing the pressure in the internal combustion engine. For example, the pressure inside the internal combustion engine can rise to 7 bars. This increase of pressure results in a braking torque, therefore decreasing the rotational speed of the internal combustion engine 12 and braking the vehicle propelled by the engine system. Hence, the braking configuration can be used to brake the vehicle. The braking configuration is represented on FIG. 5.

It is to be noted that, when the first and second proportional exhaust valves 42, 46 are in their closed position, the air fed to the first and second set of cylinders 16, 22 by the intake conduit 81 can still escape the set of cylinders, in particular through leakages, to avoid excessive pressure building which could damage the engine system 10. In other words, the flow of exhaust gas 48 can never be fully prevented, and can only be restricted. Similarly, the flow of exhaust gas 44 can only be fully prevented when the flow of exhaust gas 40 is allowed.

Furthermore, in the example, in the cylinder deactivation configuration, the second proportional exhaust valve 46 is described as closed as a simplification, although the flow of exhaust gas is still partially permitted, in particular through leakages. Advantageously, and practically speaking, in the cylinder deactivation configuration, the second proportional exhaust valve 46 is not completely closed, but is only partly, or almost completely, closed. By only partly closing the second proportional exhaust valve 46, the flow of exhaust gas 48 is restricted, that is, encounter a fluidic resistance, allowing for an increase in pressure in the second exhaust collector 26. For example, in the cylinder deactivation configuration, the closing of the second proportional exhaust valve 46 is chosen so that the pressure in the second exhaust collector 26 is between 1 bar and 3 bars.

Similarly, in the braking configuration, the first and second proportional exhaust valves 42, 46 are described as closed as a simplification, although the flow of exhaust gases 44, 48 are still partially permitted, in particular through leakages. Advantageously and practically speaking, in the braking configuration, the first and second proportional exhaust valves 42, 46 are not completely closed, but are only partly, or almost completely, closed. By only partly closing the first and second proportional exhaust valves 42, 46, the flows of exhaust gas 44, 48 are restricted, that is, encounter a fluidic resistance, allowing for an increase in pressure in the first and second exhaust collectors 20, 26, in the example up to 7 bars.

On the contrary, in the neutral configuration and in the braking configuration, the proportional recirculation valve 38 is fully closed so as to prevent the flow of exhaust gas 40.

It is therefore understood that, in the present description, the "closed" state of a valve does not necessarily correspond to a state in which the valve is completely, tightly closed, but rather to a state in which the valve is approaching complete closure, that is, in a state furthest from being completely open.

To operate the first and second proportional exhaust valves 42, 46 and the proportional recirculation valve 38, the engine system 10 comprises a single actuator 50 comprising an output component 51. The output component 51 is operable by the actuator 50 in two different direction of movement. Thus, the actuator 50 is operable in two different modes.

In the example, the actuator 50 is a rotating actuator and the output component 51 can be operated by the actuator 50 in two different directions of rotation.

As an alternative, not shown, the actuator 50 is a linear actuator and the output component 51 can be operated by the actuator 50 in two different directions of translation. The actuator is, for example, a rack and pinion system, or any other kind of actuator having two different directions of movement.

The output component 51 is in a neutral position when the engine system 10 is in the neutral configuration. From its neutral position, the output component 51 is operable in two directions of movement, opposite to each other.

Figure 6:
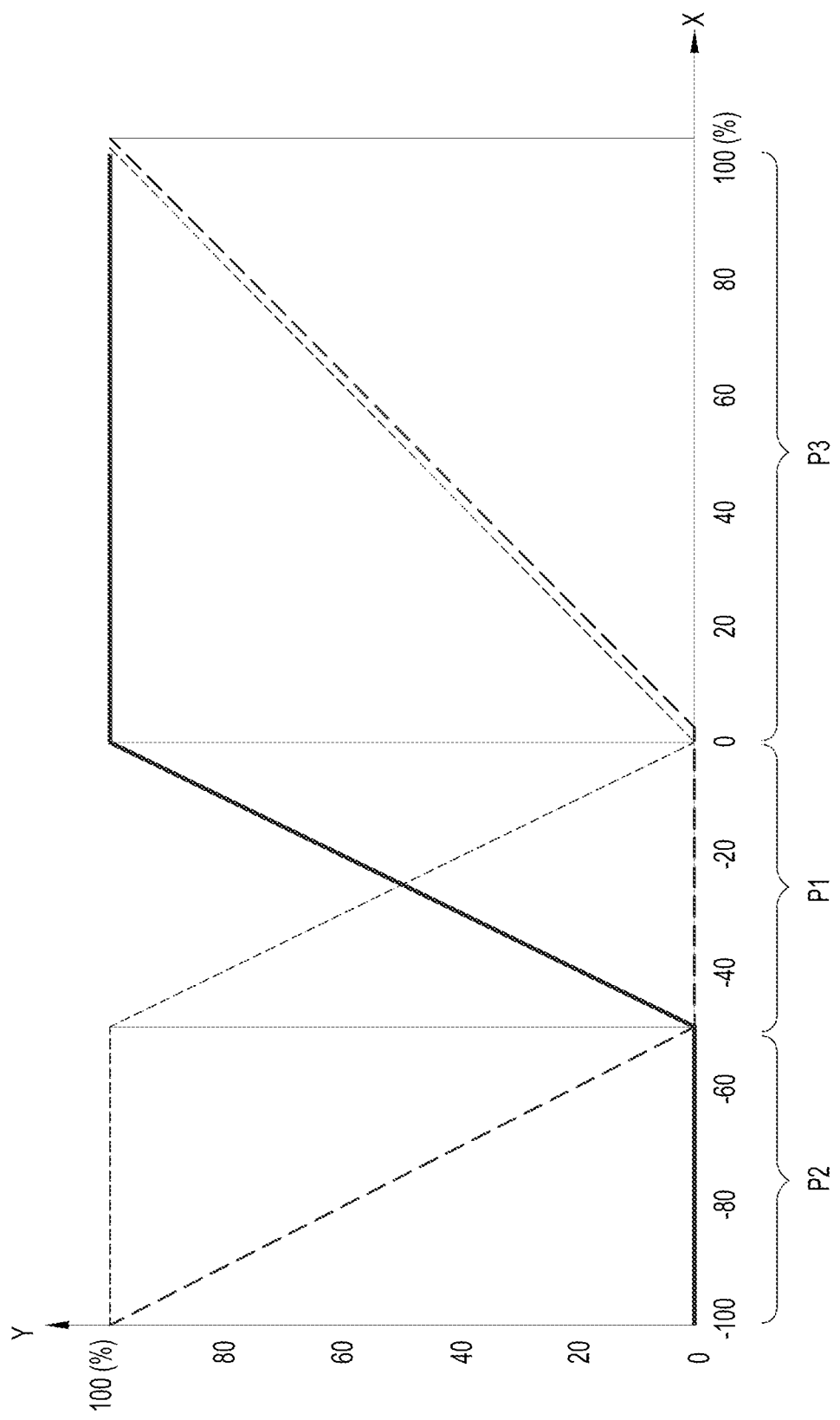
FIG. 6 is a diagram illustrating the position of certain valves of the engine system of FIG. 1, in the four configuration of the engine system.

On FIG. 6 is shown a diagram illustrating the positions of the proportional recirculation valve 38, represented by a continuous bold line, of the first proportional exhaust valve 42, represented by a long dashed line, and of the second proportional exhaust valve 46, represented by a short dashed line.

On FIG. 6, the X-axis represents the range of movement of the output component 51, expressed as a percentage of the maximum possible range of movement of the output component, with the value of 0% corresponding to the neutral position of the output component, with −100% corresponding to the maximum movement of the output component in a first direction of movement, and +100% corresponding to the maximum movement of the output component in a second direction of movement, opposite to the first direction.

On FIG. 6, the Y-axis represents the percentage of closing of the proportional recirculation valve 38, of the first proportional exhaust valve 42, and of the second proportional exhaust valve 46, with 0% corresponding to the open position of the valves and 100% corresponding to the closed position of the valves.

When the actuator 50 is operated in a first mode, the output component 51 moves from its neutral position towards a first position, according to a first movement, along a first direction of movement R1.

When the actuator 50 is operated in a second mode, the output component 51 moves from its first position towards a second position, according to a second movement, along the first direction of movement R1. In other words, in the second mode of operation of the actuator 50, the movement of the output component is continued from the first position with the same direction of movement R1 as when the actuator is operated in the first mode.

When the actuator 50 is operated in a third mode, the output component 51 moves from its neutral position towards a third position, according to a third movement, along a second direction of movement R2 opposite to the first direction of movement R1.

In the example, the first direction of movement is a first rotation R1 around a rotation axis A51 of the component 51, with a first orientation, whereas the second direction of movement is a second rotation R2 around the axis A51 of the component 51, with a second orientation, opposite to the first orientation.

In the example, the first mode of operation of the actuator 50 leads the output component 51 to operate the proportional recirculation valve 38, the first proportional exhaust valve 42 and the second proportional exhaust valve 46 so that the engine system 10 switches from its neutral configuration towards its recirculation configuration. In other words, in the example, the engine system is in the recirculation configuration when the output component 51 is in the first position. Therefore, the first mode of operation of the actuator 50 leads the output component 51 to operate the proportional recirculation valve 38 from its closed position to its open position, to operate the first proportional exhaust valve 42 from its open position to its closed position and to not operate the second proportional exhaust valve 46, that is, to hold open the second proportional exhaust valve.

In the example, the second mode of operation of the actuator 50 leads the output component 51 to operate the proportional recirculation valve 38, the first proportional exhaust valve 42 and the second proportional exhaust valve 46 so that the engine system 10 switches from its recirculation configuration towards its cylinder deactivation configuration. In other words, in the example, the engine system is in the cylinder deactivation configuration when the output component 51 is in the second position. Therefore, the second mode of operation of the actuator 50 leads the output component 51 to hold open the proportional recirculation valve 38, to hold closed the first proportional exhaust valve 42 and to operate the second proportional exhaust valve 46 from its open position to its closed position.

Advantageously, the first mode and second mode of operation of the actuator 50 can be sequenced to switch the engine system 10 from its neutral configuration to its cylinder deactivation configuration, via its recirculation configuration.

In the example, the third mode of operation of the actuator 50 leads the output component 51 to operate the proportional recirculation valve 38, the first proportional exhaust valve 42 and the second proportional exhaust valve 46 so that the engine system 10 switches from its neutral configuration towards its braking configuration. In other words, in the example, the engine system is in the braking configuration when the output component 51 is in the third position. Therefore, the third mode of operation of the actuator 50 leads the output component 51 to close the first and the second proportional exhaust valves 42, 46, and to not operate the proportional recirculation valve 38, that is, to hold closed the proportional recirculation valve.

In other words, in the example, the proportional recirculation valve 38 is operated only by the first mode of operation of the actuator, and is thus held in its position by the second and third modes of operation of the actuator, the first proportional exhaust valve 42 is operated only by the first and the third modes of operation of the actuator 50, and is thus held in its position by the second mode of operation of the actuator, and the second proportional exhaust valve 46 is operated only by the second and the third modes of operation of the actuator, and is thus held in its position by the first mode of operation of the actuator.

On FIG. 6, the first mode of operation of the actuator 50 corresponds to the phase P1 of the diagram, that is, corresponds to the first movement of the output component 51. The first movement of the output component corresponds to a movement along the first direction of movement R1 from 0% to −50% of its maximum movement range. Thus, at −50% on the X-axis, the output component 51 is in the first position and the engine system 10 is in the recirculation configuration. The second mode of operation of the actuator 50 corresponds to the phase P2 of the diagram, that is, corresponds to the second movement of the output component. The second movement of the output component corresponds to a movement along the first direction of movement R1 from −50% to −100% of its maximum movement range. Thus, at −100% on the X-axis, the output component is in the second position and the engine system is in the cylinder deactivation configuration. The third mode of operation of the actuator 50 corresponds to the phase P3 of the diagram, that is, corresponds to the third movement of the output component. The third movement of the output component corresponds to a movement along the second direction of movement R2 from 0% to +100% of its maximum movement range. Thus, at +100% on the X-axis, the output component is in the third position and the engine system is in the braking configuration.

To selectively operate the valves 38, 42 and 46 with the output component 51 depending on the mode of operation of the actuator 50, the engine system 10 comprises a kinematic chain that connects the output component 51 to the valves 38, 42 and 46.

The kinematic chain comprises a main shaft 60, which rotates around a rotation axis A60, and which is connected to the output component 51 of the actuator 50. The main shaft 60 is driven by the output component regardless of the direction of movement R1, R2 of the output component. In other words, the first, second and third movements of the output component are transmitted to the main shaft 60. Thus, the first direction of movement R1 of the output component 51 corresponds to a first direction of movement R11 of the main shaft 60, which is a rotation around the axis A60 is a first direction, and the second direction of movement R2 of the output component corresponds to a second direction of movement R12 of the main shaft, which is a rotation around the axis A60 in a second direction.

In the example, the kinematic chain comprises an input component 62, which interacts with the output component 51 so that the movement of the output component is transmitted to the main shaft 60. For example, the output component 51 and the input component 62 are gears that are engaged together. Other designs of output component 51 and of the input component 62 can be considered for the output component to drive the main shaft 60.

The kinematic chain comprises a first cam system 64, comprising a first cam 66 mounted onto the main shaft 60 and a first follower 68 attached to the first proportional exhaust valve 42. Advantageously, the profile of the first cam 66 is configured such that, during the first movement of the output component 51, the first cam engages the first follower 68 so that the first follower closes the first proportional exhaust valve 42, is configured such that, during the second movement of the output component, the first cam engages the first follower so that the first follower holds closed the first proportional exhaust valve, that is, does not operate the first proportional exhaust valve, and is configured such that, during the third movement of the output component, the first cam engages the first follower so that the first follower closes the first proportional exhaust valve 42.

In the example, the first follower 68 is not directly attached to the first proportional exhaust valve 42, but is indirectly attached to the shaft 56 on which the flap 52 is fixed through intermediate cranks.

The kinematic chain comprises a second cam system 70, comprising a second cam 72 mounted onto the main shaft 60 and a second follower 74 attached to the second proportional exhaust valve 46. Advantageously, the profile of the second cam 72 is configured such that, during the first movement of the output component 51, the second cam engages the second follower 74 so that the second follower holds open second proportional exhaust valve 46, that is, does not operate the second proportional exhaust valve, is configured such that, during the second movement of the output component, the second cam engages the second follower so that the second follower closes the second proportional exhaust valve, and is configured such that, during the third movement of the output component, the second cam engages the second follower so that the second follower closes the second proportional exhaust valve 42.

In the example, the second follower 74 is not directly attached to the second proportional exhaust valve 46, but is indirectly attached to the shaft 58 on which the flap 54 is fixed through intermediate cranks.

The kinematic chain comprises a third cam system 76, comprising a third cam 78 mounted onto the main shaft 60 and a third follower 80 attached to the proportional recirculation valve 38. Advantageously, the profile of the third cam 78 is configured such that, during the first movement of the output component 51, the third cam engages the third follower so that the third follower opens the proportional recirculation valve 38, is configured such that, during the second movement of the output component, the third cam engages the third follower so that the third follower holds open the proportional recirculation valve, that is, does not operate the proportional recirculation valve, and is configured such that, during the third movement of the output component, the third cam engages the third follower so that the third follower holds closed the proportional recirculation valve, that is, does not operate the proportional recirculation valve.

In the example, the third follower 80 is directly attached to the proportional recirculation valve 38.

Practically speaking, in the example, the cams 66, 72 and 78 can hold the valves 42, 46 and 38 in their position during certain movements of the output component because, during these movements, the distance measured between the axis A60 and a contact point between the cam profile and the corresponding follower 68, 74, 80 remains constant. Thus, due to this distance being constant, a rotation of a cam 66, 72 or 68 does not lead to a movement of the corresponding follower 68, 74, 80.

In the example, the first follower 68, the second follower 74 and the third follower 80 are roller followers, also known as track rollers. Therefore, the followers are only displaced by the cams 66, 72 and 78 in one direction, thus forcing only one movement of the valves 42, 46 and 38, between their opening and their closing.

Here, the first and second followers 68, 74 can force the closing of the first and second proportional exhaust valves 42, 46, but cannot force their opening. However, when the first and second followers 68, 74 are not in contact with the first and second cams 66, 72, the first and second proportional exhaust valves return to their open position, the open position being a resting position of the first and second proportional exhaust valve. Furthermore, the return to their open position is facilitated by the flows of exhaust gases 44 and 48, which tends to exert a pressure respectively onto the flaps 52 and 54, leading to their opening due to the shafts 56, 58 being off-center relative to the flaps.

Here, the third follower 80 can force the opening of the proportional recirculation valve 38, but cannot force its closing. However, when the third follower is not in contact with the third cam 78, the proportional recirculation valve return to its closed position, the closed position being a resting position of the proportional recirculation valve. This return to the closed position is ensured by the return spring exerting a force on the proportional recirculation valve.

In the example, due to the profile of the cams 66 and 72, the movement of the first proportional exhaust valve 42 is advantageously identical to the movement of the second proportional exhaust valve 46 during the third movement of the output component 51. In other words, the closing of the first proportional exhaust valve 42 is identical to the closing of the second proportional exhaust valve 46, that is, the third movement of the output component 51 closes the first and the second proportional exhaust valves 42, 46 simultaneously and at the same speed.

Thanks to the kinematic chain of the engine system 10, the first movement of the output component 51 operates the first proportional exhaust valve 42 and the proportional recirculation valve 38 and does not operate the second proportional exhaust valve 46, the second movement of the output component 51 operates only the second proportional exhaust valve 46 and the third movement of the output component operates the first and second proportional exhaust valve and does not operate the proportional recirculation valve.

Therefore, thanks to the kinematic chain of the engine system 10, the actuator 50 alone is sufficient to operate the three valves 38, 42 and 46. Therefore, it is possible to switch the engine system 10 from the neutral configuration to the braking configuration, or to the recirculation configuration, or to the cylinder deactivation configuration, only by actuating the output component 51 of the actuator 50 in a first or in a second direction of movement.

The number of actuators needed to operate the engine system 10 is thus reduced, in comparison with existing engine system, leading to a decrease in the manufacturing cost of the engine system 10 and a better compactness of the engine system. The control of the valves 38, 42 and 46 is also facilitated and more reliable, since only one actuator is operating all these valves, and therefore only one actuator needs to be controlled to modify the configuration of the engine system 10.

It is to be understood that the switching of the engine system 10 from its neutral configuration to its braking configuration or to its cylinder deactivation configuration, as well as the switching of the engine system from its cylinder deactivation configuration to its recirculation configuration, are described here above in details, but that the actuator 50 and the kinematic chain 60-80 also permits switching the engine system from its braking configuration to its neutral configuration, from its recirculation configuration to its cylinder deactivation configuration and from its cylinder deactivation configuration to its neutral configuration.

In particular, a reverse of the first movement of the output component 51 leads to the opening of the first proportional exhaust valve 42 and the closing of the proportional recirculation valve 38 through the operating of the kinematic chain, due to the pressure exerted by exhaust gases onto the first proportional exhaust valve, and due to the elastic spring exerting a force onto the proportional recirculation valve, while not operating the second proportional exhaust valve 46, and thus allows switching the engine system from its recirculation configuration to its neutral configuration.

Similarly, a reverse of the second movement of the output component 51 leads to the opening of the second proportional exhaust valve 46, through the operating of the kinematic chain and due to the pressure exerted by exhaust gases onto the second proportional exhaust valve, while not operating the first proportional exhaust valve 42 and the proportional recirculation valve 38, and thus allows switching the engine system from cylinder deactivation configuration to its recirculation configuration.

Furthermore, a reverse of the third movement of the output component 51 leads to the opening of the first and second proportional exhaust valves 42, 46, through the operating of the kinematic chain and due to the pressure exerted by exhaust gases onto the proportional exhaust valves, while not operating the proportional recirculation valve 38, and thus allowing switching the engine system from its braking configuration to its neutral configuration.

More precisely, the reverse of the first movement of the output component 51 corresponds to a movement of the output component from the first position to the neutral position, the reverse of the second movement of the output component 51 corresponds to a movement of the output component from the second position to the first position, and the reverse of the third movement of the output component corresponds to a movement of the output component from the third position to the neutral position.

In the example of the FIG. 6, it is shown that the amplitude of the first movement of the output component 51 is equal to the amplitude of the second movement of the output component, each being equal to 50% of the maximum movement range of the output component. It is to be understood that these values are given only as example, and are not limitative. For example, the amplitude of the second movement could be half, or twice, the amplitude of the first movement.

Another embodiment of the engine system 10 is now described, with reference to FIG. 1. In this embodiment, the elements similar to those in the embodiment described here above are referred to in the same way and function in the same way. In the following, the differences between the two embodiments are mainly described. On FIG. 1, the elements specific to this embodiment are shown in dotted lines.

In this embodiment, the engine system 10 comprises a second exhaust gas recirculation system 134, comprising a second recirculation conduit 136, providing fluid communication between the second exhaust collector 26 and the intake 14 of the internal combustion engine 12, and a second proportional recirculation valve 138, adapted to control a flow of exhaust gas 140 in the second recirculation conduit 136, and operable between an open position in which the flow of exhaust gas in the second recirculation conduit is allowed, and a closed position in which the flow of exhaust gas in the second recirculation conduit is prevented and which is occupied by the second proportional recirculation valve at rest. The second proportional recirculation valve 138 is a continuously operable valve, that is, a valve continuously opening and closing between its open position and its closed position.

Practically speaking, the second exhaust gas recirculation system 134 and the second proportional recirculation valve 138 are operating similarly to the exhaust gas recirculation system 34 and to the proportional recirculation valve 38.

The kinematic chain of the engine system 10 may be configured to operate the second proportional recirculation valve 138 in such a way that, during the first movement of the output component 51, the output component operates the second proportional exhaust gas 138 from its closed position to its open position, in such a way that, during the second movement of the output component, the output component holds the second proportional exhaust valve open, and in such a way that, during the third movement of the output component, the output component does not operate the second proportional exhaust valve, that is, keeps the second proportional exhaust valve closed. In other words, in all modes of operation of the actuator 50, the second proportional exhaust valve 138 is operated by the output component 51 in the same way that the proportional exhaust valve 38.

To operate the second proportional exhaust valve 138, the kinematic chain comprises, for example, a fourth cam system, not shown, comprising a fourth cam mounted onto the main shaft 60 and a fourth follower attached to the proportional recirculation valve. Advantageously, the profile of the fourth cam is configured such that, during the first movement of the output component 51, the fourth cam engages the fourth follower so that the fourth follower opens the second proportional recirculation valve 138, is configured such that, during the second movement of the output component, the fourth cam engages the fourth follower so that the fourth follower holds open the second proportional recirculation valve, that is, does not operate the second proportional recirculation valve, and is configured such that, during the third movement of the output component, the fourth cam engages the fourth follower so that the fourth follower holds closed the second proportional recirculation valve, that is, does not operate the second proportional recirculation valve.

Alternatively, the operation of the second proportional exhaust valve 138 can differ from the operation of the proportional exhaust valve 38, to achieve different configurations of the engine system 10.

Hence, in this embodiment, thanks to the kinematic chain of the engine system 10, the actuator 50 alone is sufficient to operate the fourth valves 38, 42, 46 and 138. The number of actuators needed to operate the engine system 10 is thus reduced, in comparison with existing engine system, leading to a decrease in the manufacturing cost of the engine system 10 and a better compactness of the engine system.

As a variant, not shown, the actuator 50 and the kinematic chain are used to operate other valves in the engine system 10 than the valves described here above, such as, for example, a valve controlling the flow of air passing through the charged air cooler 84, and/or a valve controlling a flow of gas between the turbocharger 28 and the exhaust aftertreatment system 82, or downstream of the exhaust aftertreatment system 82, and/or a valve controlling a flow of gas upstream of the compressor 86. Thus, the actuator 50 can be used to operate three valves, four valves, or even five distinct valves or more.

In the example, the first and second proportional exhaust valves 42, 46 are located at the exhaust of the first and second exhaust collectors 20, 26, upstream of the first and second exhaust conduits 30, 32, in the direction of gas flows 44 and 48. As a variant, not shown, the first and second proportional exhaust valves 42, 46 are located inside the turbocharger 28, or respectively inside the first exhaust collector 20 and inside the second exhaust collector 26.

As a variant, not shown, the actuator 50 is configured so that the output component 51 can only move, from its neutral position, along the first direction of movement R1. In other words, in this variant, the output component 51 cannot move from the neutral position along the second direction of movement R2, towards its third position, and the engine system 10 cannot reach the braking configuration. This variant is advantageous when the engine system is installed in a vehicle not needing the braking configuration, since it allows for a more simple conception of the kinematic chain, thus reducing the manufacturing cost of the engine system.

As a variant, not shown, the actuator 50 is operable in a fourth mode, in which the output component 51 moves from its second position towards a fourth position, according to a fourth movement, along the first direction of movement R1. This fourth mode allows for reaching a new configuration of the engine system, not described. Similarly, according to another variant, the actuator 50 is operable in a fifth mode, in which the output component 51 moves from its third position towards a fifth position, according to a fifth movement, along the second direction of movement R2.

As a variant, not shown, the movement of the main shaft 60 is not transmitted to the first and second proportional exhaust valves 42, 46 and to the proportional recirculation valve 38 by cam systems, but by other transmission mechanisms. For example, each valve 42, 46, 38 is connected to the main shaft by a crank mechanism, with each crank mechanism comprising means for not transmitting some motions of the main shaft to the associated valve, such as a disengagement system or an elastic-connection system.

In the example, the cam systems 64, 70, 76 are using roller followers. As a variant, not shown, the cam systems 64, 70, 76 are desmodromic cam systems, that is, cam systems allowing to force the opening and the closing of the first proportional exhaust valve 42, of the second proportional exhaust valve 46 and of the proportional recirculation valve 38. Thanks to these desmodromic cam systems, the valves are positively open and positively closed. For example, the opening of the first and second proportional exhaust valve do not rely on the pressure exerted by the exhaust gases on the flaps 52, 54. Thus, the position of the first and second proportional exhaust valve and of the proportional recirculation valve are precisely controlled both when opening and closing, eliminating any risk of jamming. A desmodromic cam system comprises, for example, a cam in which a groove is provided, and a follower, which is a rod, or a pin, engaged into the groove. Thus, the rotation of the cam leads to the translation of the follower, which follows the profile of the groove. Since the follower is engaged into the groove, the cam can exert forces onto the follower directed away from the cam axis and towards the cam axis.

In the example, the cams 66, 72 and 78 are all mounted on the main shaft 60. As a variant, not shown, one or more cams are mounted on a secondary shaft, with the secondary shaft connected to the main shaft so that the movement of the main shaft is transmitted to the secondary shaft. According to another variant, each cam is mounted on a dedicated shaft, all the shafts interacting with the output component 51 so that the movement of the output component is transmitted to all the shafts.

On the exemplary diagram of FIG. 6, the transition between the phase P1 and P2 of the diagram is immediate. In other words, if the output component 51 performs the first and the second movement one after the other, the second proportional exhaust valve 46 starts closing as soon as the first proportional exhaust valve 42 is fully closed and the proportional recirculation valve 38 is fully opened. As an alternative, not shown, the cam systems 64, 70 and 76 are configured so that, between the first and second movements of the output component 51, a transitional movement is executed, during which no movement of the valves 38, 42 and 46 is driven by the output component.

On the exemplary diagram of FIG. 6, at the end of the first movement of the output component 51, the first proportional exhaust valve 42 is fully closed and the proportional recirculation valve 38 is fully open simultaneously. In other words, in the example, the first proportional exhaust valve opens at the same speed as the proportional recirculation valve closes. It is to be understood that this characteristic is merely an example, and that different operating speeds of the valves can be considered. For example, the first proportional exhaust valve 42 can be fully closed before the end of the first movement of the output component 51, or the proportional recirculation valve 38 can be fully opened before the end of the first movement of the output component.

Similarly, in the example, at the start of the first movement of the output component, the opening of the proportional recirculation valve 38 starts simultaneously to the closing of the first proportional exhaust valve 42. As a variant, not shown, the opening of the proportional recirculation valve 38 does not start simultaneously to the closing of the first proportional exhaust valve 42. For example, the opening of the proportional recirculation valve starts before the closing of the first proportional exhaust valve.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of inventive concepts being set forth in the following claims.

What is claimed is:

1. An engine system, comprising:
   an internal combustion engine, comprising an intake, a first set of cylinders including at least a first cylinder and a first exhaust collector, and a second set of cylinders including at least a second cylinder and a second exhaust collector,
   a turbocharger,
   a first exhaust conduit, providing fluid communication between the first exhaust collector and the turbocharger,
   a second exhaust conduit, providing fluid communication between the second exhaust collector and the turbocharger,
   an exhaust gas recirculation system, comprising:
   a recirculation conduit, providing fluid communication between the first exhaust collector and the intake of the internal combustion engine, and
   a proportional recirculation valve, adapted to control a flow of exhaust gas in the recirculation conduit, and operable between an open position in which the flow of exhaust gas is allowed, and a closed position in which the flow of exhaust gas is prevented and which is occupied by the proportional recirculation valve at rest, the proportional recirculation valve continuously opening and closing between its open position and its closed position,
a first proportional exhaust valve, adapted to control a flow of exhaust gas in the first exhaust conduit, and operable between an open position in which the flow of exhaust gas is allowed and which is occupied by the first proportional exhaust valve at rest, and a closed position in which the flow of exhaust gas is prevented, the first proportional exhaust valve continuously opening and closing between its open position and its closed position, and
a second proportional exhaust valve, adapted to control a flow of exhaust gas in the second exhaust conduit, and operable between an open position in which the flow of exhaust gas is allowed and which is occupied by the second proportional exhaust valve at rest, and a closed position in which the flow of exhaust gas is prevented, the second proportional exhaust valve continuously opening and closing between its open position and its closed position,
wherein the engine system comprises an actuator, and a kinematic chain configured to operate the proportional recirculation valve, the first proportional exhaust valve and the second proportional exhaust valve, the actuator comprising an output component driving the kinematic chain,
wherein the engine system is in a neutral configuration when the first proportional exhaust valve and the second proportional exhaust valve are open and the proportional recirculation valve is closed, the output component of the actuator being in a neutral position when the engine system is in the neutral configuration,
wherein the output component and the kinematic chain are configured such that a first movement of the output component, from its neutral position towards a first position and in a first direction, is adapted to drive the kinematic chain so as to open the proportional recirculation valve, close the first proportional exhaust valve and not operate the second proportional exhaust valve, the second proportional exhaust valve staying in its open position during the first movement,
wherein the output component and the kinematic chain are configured such that a second movement of the output component, from its first position towards a second position and in the first direction, is adapted to drive the kinematic chain so as to close the second proportional exhaust valve, hold open the proportional recirculation valve and hold closed the first proportional exhaust valve;
wherein the kinematic chain comprises:
a main shaft connected to the output component of the actuator, and
a first cam system, comprising a first cam mounted onto the main shaft and a first follower attached to the first proportional exhaust valve, wherein the profile of the first cam is configured such that:
during the first movement of the output component, the first cam engages the first follower so that the first follower closes the first proportional exhaust valve, and
during the second movement of the output component, the first cam engages the first follower so that the first follower hold closed the first proportional exhaust valve.
2. The engine system of claim 1, wherein the kinematic chain further comprises:

a second cam system, comprising a second cam mounted onto the main shaft and a second follower attached to the second proportional exhaust valve, wherein the profile of the second cam is configured such that:
during the first movement of the output component, the second cam engages the second follower so that the second follower does not operate the second proportional exhaust valve, and
during the second movement of the output component, the second cam engages the second follower so that the second follower closes the second proportional exhaust valve,
a third cam system, comprising a third cam mounted onto the main shaft and a third follower attached to the proportional recirculation valve, wherein the profile of the third cam is configured such that:
during the first movement of the output component, the third cam engages the third follower so that the third follower opens the proportional recirculation valve, and
during the second movement of the output component, the third cam engages the third follower so that the third follower holds open the proportional recirculation valve.

3. The engine system of claim 2, wherein the first follower, the second follower and the third follower are roller followers.

4. The engine system of claim 2, wherein the first cam system, the second cam system and the third cam system are desmodromic cam systems, allowing to force the opening and the closing of the first proportional exhaust valve, of the second proportional exhaust valve and of the proportional recirculation valve.

5. The engine system of claim 1, wherein the first proportional exhaust valve and the second proportional exhaust valve are asymmetric flap valves comprising each a flap and a valve shaft, wherein the valve shafts are configured such that the rotations of the valve shafts lead to the opening or closing of the flaps and wherein the output component, the kinematic chain and the valve shafts are configured such that the rotation of the valve shafts is driven by the output component.

6. The engine system of claim 5, wherein the valve shaft of the first proportional exhaust valve is off-center with respect to the flap of the first proportional exhaust valve and located outside of the flow of exhaust gas in the first exhaust conduit, and wherein the valve shaft of the second proportional exhaust valve is off-center with respect to the flap of the second proportional exhaust valve and located outside of the flow of exhaust gas in the second exhaust conduit.

7. The engine system of claim 1, wherein the proportional recirculation valve is a poppet valve.

8. The engine system of claim 1, wherein the output component and the kinematic chain are configured such that a third movement of the output component, from its neutral position towards a third position and in a second direction opposite to the first direction, is adapted to drive the kinematic chain so as to close the first proportional exhaust valve and the second proportional exhaust valve and not operate the proportional recirculation valve, the proportional recirculation valve staying in its closed position during the third movement.

9. The engine system of claim 8, wherein the output component and the kinematic chain are configured such that the third movement of the output component closes the first proportional exhaust valve and the second proportional exhaust valve simultaneously and at the same speed.

10. The engine system of claim 1, wherein the engine system further comprises a second exhaust gas recirculation system, comprising:
- a second recirculation conduit, providing fluid communication between the second exhaust collector and the intake of the internal combustion engine, and
- a second proportional recirculation valve, adapted to control a flow of exhaust gas in the second recirculation conduit, and operable between an open position in which the flow of exhaust gas in the second recirculation conduit is allowed, and a closed position in which the flow of exhaust gas in the second recirculation conduit is prevented and which is occupied by the second proportional recirculation valve at rest, the second proportional recirculation valve continuously opening and closing between its open position and its closed position,
- wherein the kinematic chain is configured to operate the second proportional recirculation valve,
- wherein the first movement of the output component drives the kinematic chain so as to open the second proportional recirculation valve, and wherein the second movement of the output component drives the kinematic chain so as to hold open the second proportional recirculation valve.

11. The engine system of claim 1, wherein the first follower is a roller follower.

12. The engine system of claim 1, wherein the first cam system is a desmodromic cam system, allowing to force the opening and the closing of the first proportional exhaust valve, of the second proportional exhaust valve and of the proportional recirculation valve.

13. The engine system of claim 1, wherein the kinematic chain further comprises:
- a second cam system, comprising a second cam mounted onto the main shaft and a second follower attached to the second proportional exhaust valve, wherein the profile of the second cam is configured such that:
    - during the first movement of the output component, the second cam engages the second follower so that the second follower does not operate the second proportional exhaust valve, and
    - during the second movement of the output component, the second cam engages the second follower so that the second follower closes the second proportional exhaust valve.

14. The engine system of claim 13, wherein the second follower is a roller follower.

15. The engine system of claim 13, wherein the second cam system is a desmodromic cam system, allowing to force the opening and the closing of the first proportional exhaust valve, of the second proportional exhaust valve and of the proportional recirculation valve.

16. The engine system of claim 1, wherein the kinematic chain further comprises:
- a third cam system, comprising a third cam mounted onto the main shaft and a third follower attached to the proportional recirculation valve, wherein the profile of the third cam is configured such that:
    - during the first movement of the output component, the third cam engages the third follower so that the third follower opens the proportional recirculation valve, and
    - during the second movement of the output component, the third cam engages the third follower so that the third follower holds open the proportional recirculation valve.

17. The engine system of claim 16, wherein the third follower is a roller follower.

18. The engine system of claim 16, wherein the third cam system is a desmodromic cam system, allowing to force the opening and the closing of the first proportional exhaust valve, of the second proportional exhaust valve and of the proportional recirculation valve.

\* \* \* \* \*